Inventor
Kenneth B. Pulford
By his Attorney

Nov. 29, 1955 K. B. PULFORD 2,725,033
SHOE SOLE CEMENT APPLYING MACHINES
Filed March 25, 1952 2 Sheets-Sheet 2
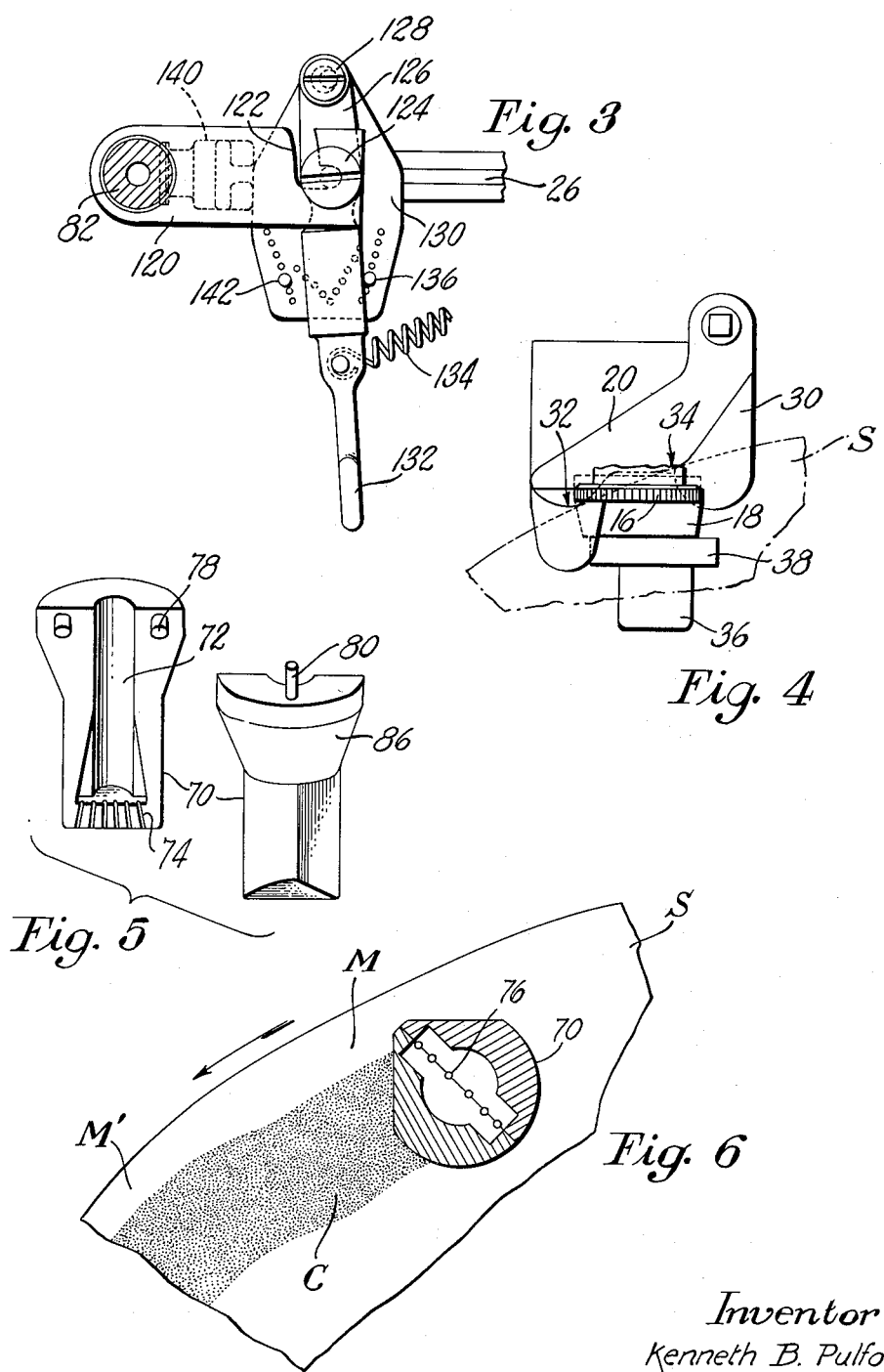
Inventor
Kenneth B. Pulford
By his Attorney

United States Patent Office 2,725,033
Patented Nov. 29, 1955

2,725,033

SHOE SOLE CEMENT APPLYING MACHINES

Kenneth Blanchard Pulford, Leicester, England, assignor to United Shoe Machinery Corporation, Flemington, N. J., a corporation of New Jersey Application March 25, 1952, Serial No. 278,358

Claims priority, application Great Britain April 21, 1951

3 Claims. (Cl. 118—407)

This invention relates to sole cement applying machines, of the type shown in Letters Patent of the United States No. 2,042,479, granted June 2, 1936, upon the application of C. A. Newhall, and particularly to improvements therein some of which facilitate their use with quick curing cements.

In machines of the type shown in the above-mentioned patent, pieces of work such as shoe soles are each moved progressively past a nozzle, by means of coacting feed rolls and properly related gage points, to enable a band of cement to be applied around the margin. They have been extensively used with cements of the type which do not harden or cure quickly but now, because of the considerable proportion of shoes which employ soles of synthetic material, it is desired to use another type of cement which cures rapidly and which if left in the machine for any substantial number of hours (as for example over night) tends to harden within the machine and to become insoluble in any solvent at present generally available. One such cement is a mixture of di-isocyanate modified polyester amide, which mixture offers certain advantages in the manufacture of some shoes and may become hardened within the machine. If, then, it is desired to clean the machine, it will frequently be necessary to dismantle all the parts which come in contact with the cement and this is an extensive and time consuming operation.

Accordingly, an object of the invention is to provide a machine of this type which may be quickly disassembled and readily cleaned. The machine as illustrated provides a cement pot from which the cement is pushed out and delivered to an applying nozzle by compressed air and in accordance with features of the invention the connections between the nozzle and the pot and an interposed operator-controlled valve are readily detached and their arrangement in a straight line greatly facilitates a cleaning operation.

It is frequently desired, in the cementing of shoe soles, to vary the radial distance between the band of cement and the periphery of the sole, this space being referred to as a clean margin, as between the forepart portion and the shank portion of a sole. In accordance with another feature of the invention this variation is facilitated by arranging the nozzle, as shown in the illustrated machine, so that it may be moved laterally toward and away from the edge gage. As herein illustrated the cement pot, the control valve and the nozzle are rigidly interconnected as a unit and the cement pot is hung upon trunnions. This accomplishes two objects; it facilitates the complete removal of this unit for cleaning purposes, and it permits the nozzle to be swung about these trunnions by means of a hand lever to vary the distance between the nozzle and the edge gage.

These and other features of the invention will best be understood from the consideration of the following specification taken in connection with the accompanying drawings in which Fig. 1 is a front elevation of the machine;

Fig. 3 is an enlarged detail in plan of the hand lever for swinging the nozzle;

Fig. 4 is a plan view on a larger scale of the feed rolls and the edge gage;

Fig. 5 is an exploded view of a two-part nozzle; and

Fig. 6 is a horizontal section through the lower part of such a nozzle showing the displacement of the band of cement upon a shoe sole as the nozzle is swung.

Figure 1:
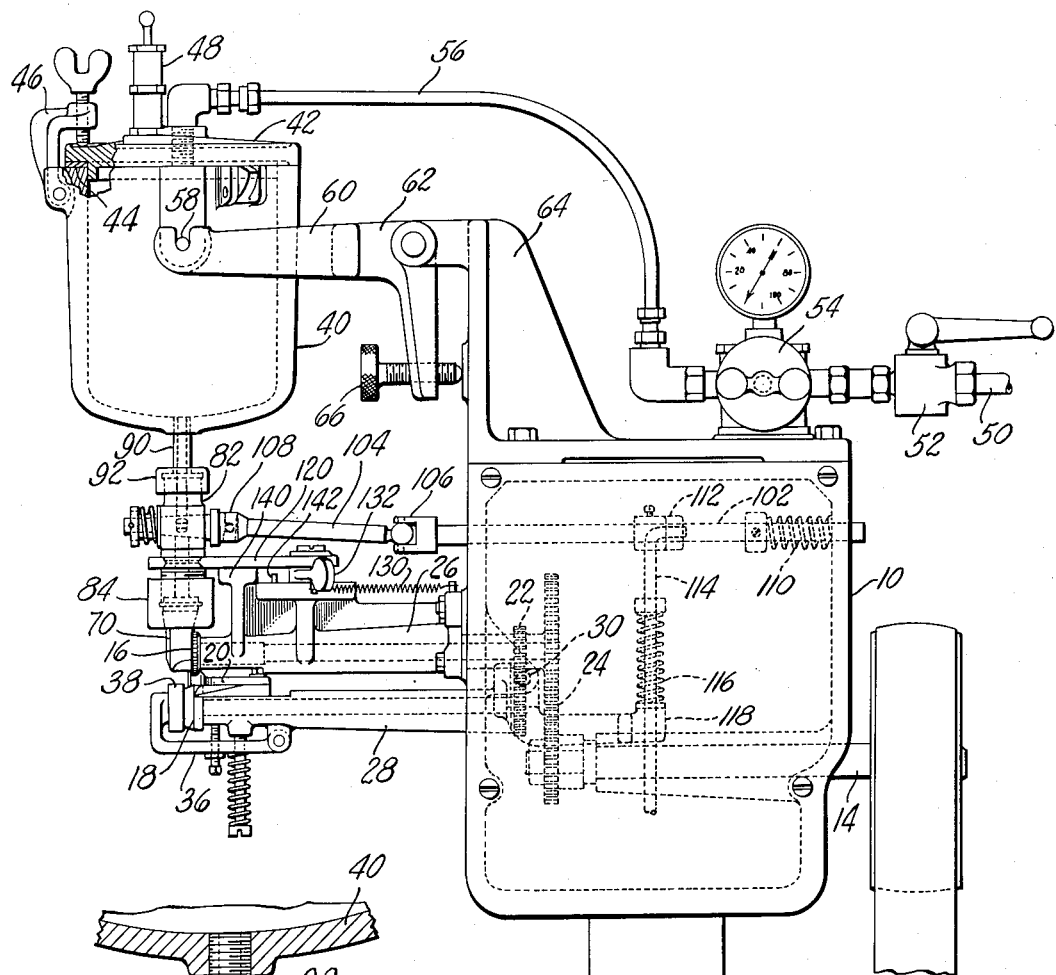

As in the above patent, the machine is provided with a box-like frame 10, the front of which is shown in Fig. 1 and this frame is mounted upon a pedestal 12, and has a drive shaft 14 protruding at the right. At the left, an upper feed roll 16 coacts with a lower feed roll 18 to carry the work past an edge gage 20 toward the rear of the machine. These feed rolls are mounted upon shafts which are interconnected by means of a pair of gears 22 and the upper shaft is joined to the drive shaft 14 by means of gears 24. The shaft carrying the upper feed roll 16 extends through and is journaled in a rigid arm 26 attached at one end to the frame while the shaft for the lower feed roll 18 is journaled in a swinging arm 28 mounted to tilt about a pivot 30 extending from front to rear of the machine. Upon this arm 28 is mounted a beveled work supporting plate 30 (Fig. 4) above which is positioned an edge gage 20 with its two projecting gage points 32 and 34. To help in supporting a piece of work such as a shoe sole S the lower arm 28 is provided with a pivoted extension 36 having a supplemental undriven supporting roll 38.

The machine differs from the patented machine in that it has no pump but is arranged to push the cement out of a pot 40 by means of compressed air. To this end the cement pot has a tight cover 42 provided with a gasket 44 and the cover is positioned against the top of the cement pot by a series of clamps 46. In the cover is a safety valve 48 and compressed air is led from a source of supply (not shown) through a conduit 50 past a shut-off valve 52 and a pressure regulator 54 and thence to the pot by means of another conduit 56 joined to the cover 42.

The cement pot has trunnions 58 resting in notches near the ends of the arms 60 of a bifurcated bell crank 62 which is pivoted in ears on an upstanding bracket 64 attached to the top of the frame 10. Thus the trunnions lie in a horizontal axis extending from the front to the back of the machine. A thumb screw 66 in the depending arm of this bell crank enables the height of the nozzle to be adjusted either to improve the operation of extrusion upon the work or to compensate for different types of work.

Figure 2:
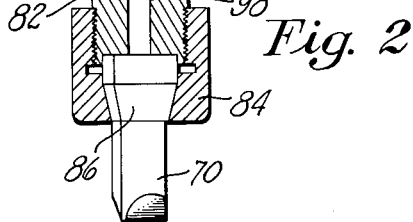
Fig. 2 is a vertical section enlarged through the valve and the connections between the cement pot and the nozzle.

A nozzle 70 (Fig. 5) is made in two parts so that it may readily be disassembled for cleaning and these two parts are grooved to form a central passage 72 extending the major part of the length thereof and are also provided with a series of small grooves 74 which match one another on the two parts and make a row of outlet openings 76 (Fig. 6). Dowels 78 are mounted on one of the parts to enable the ready assembly of the two parts in proper alinement and on the other part is an upstanding dowel 80 for locating the nozzle with respect to a valve casing 82 (Fig. 2), to the bottom of which the nozzle is forced into abutting relation by means of a screw collar 84 threaded on the bottom of the valve casing and designed to coact with a conical portion 86 on the outside of the nozzle.

The upper end of the valve casing 82 is threaded and is recessed to provide a conical socket to receive the correspondingly shaped conical end portion 88 of an outlet pipe 90 threaded in the bottom of the cement pot 40.

This conical portion 88 has a shoulder to coact with an overhanging portion of a threaded sleeve 92 by means of which the outlet pipe and the valve casing may readily be clamped together.

In the casing 82 is a frusto conical shut-off valve 94 which, as in the patented machine, is provided with a transverse passage 96 which may be alined with a passage 98 extending through the valve casing or may be positioned transversely thereof to stop the flow of cement. This valve is held firmly in the valve casing by a spring 100 and is joined to a transverse shaft 102 rotatable in the frame 10 by means of a rod 104 which is interposed between and is joined to the valve and the shaft 102 by means of universal joints 106, 108. A spring 110 inside the frame urges these joints together. On the shaft 102 is an arm 112 joined to a treadle rod 114 which may be moved by the operator to open the valve when work is being presented. On this rod is a spring 116 bearing against an extension 118 of the swinging arm 28. The arrangement is such that a depression of the treadle rod is operative to bring together the feed rolls 16 and 18 in gripping engagement with the work and to open the valve 94.

The swinging mounting of the cement pot 40 by means of the trunnions 58 is also useful in permitting the lateral adjustment of the position of the nozzle 70 toward and away from the edge gage to vary slightly the clean margin M, M' (Fig. 6) between the outer edge of a band of cement C and the periphery of the sole S. Indeed it may be preferred in the inside shank portion of a sole to eliminate the clean margin entirely and have the cement extend all the way to the periphery. In view of the fact that the variation is only a small fraction of an inch, the relation of the lower end of the swinging nozzle to the surface of a sole will not substantially change by reason of such an adjustment and a uniform band of cement will be applied throughout the whole extent of the periphery of the work.

Such a swinging movement of the nozzle is brought about by means of a link 120 having at its left end (Fig. 3) a doubly tapered opening so that the link may be mounted upon the valve casing 82 and tilted slightly with respect thereto without binding. This link has a hook-shaped slot 122 by which it may be engaged with or disengaged from the shank of a headed stud 124 which is threaded in a hand lever 126 carried upon an eccentric pin 128 which is secured to a shelf 130 formed integrally with the fixed arm 26 of the frame. At its opposite end the lever 126 has a finger piece 132 which is drawn by a spring 134, attached to it and the frame, to the right until the lever contacts a stop pin 136 which may be positioned in any one of a series of holes formed in the shelf 130. This spring will be strong enough to overcome the spring 110 and the link 120 will slide upon a support 140 integral with the roll carrying arm 26. When it is desired to have a wider margin M, as around the forepart of a sole, the finger piece 132 will be swung to the left (Figs. 1 and 3) until the lever 126 contacts another stop pin 142. When at another time, as along the inner shank portion of the sole, a narrower clean margin is desired, a release of the finger piece will allow the spring 134 to draw the hand lever against the other stop pin 136 thus swinging the nozzle 70 nearer to the edge gage 20. The eccentric pin 128 permits fine adjustments of the lever 126.

The operation of cleaning the machine is greatly simplified by the above described arrangement inasmuch as the operator has only to remove the cover 42 of the cement pot and to disconnect the link 120 from the stud 124 to enable him to lift the whole assembly of cement pot, valve casing and nozzle away from the machine. In this operation the valve member 94 will slide out of the notched end of the rod 104. Then, by unscrewing the sleeves 84 and 92, the nozzle and the valve casing and the cement pot may be separated from one another leaving only short straight passages to be cleaned and permitting the two parts of the nozzle 70 to be separated so that any cement deposited may be brushed out of the grooves quite easily. The valve assembly will be taken apart in the usual fashion.

In the operation of the machine, a sole will be positioned between the feed rolls and the treadle rod 114 depressed. As the sole margin is traversed beneath the nozzle, the operator needs only to move the finger piece 132 of the hand lever rod to vary the clean margin for the reason that the feeding of the sole in a predetermined path diagonal with respect to the end of the feed rolls is substantially automatic because of the cross feed action described in the earlier patent hereinabove mentioned.

Having thus described my invention, what I claim as new and desire to secure by Letters Patent of the United States is:

1. In a machine for applying cement to workpieces, a receptacle having a bottom outlet, an outlet conduit attached thereto and having a conical lower end portion, a valve casing the top of which is recessed to coact with said conical portion, a valve in said casing, a sleeve surrounding said conduit and said casing arranged to pull the abutting surfaces into tight contact, a substantially vertical nozzle having an enlarged top end arranged in abutting relation with the bottom of the valve casing, and an internally flanged sleeve surrounding and freely rotatable upon the nozzle and threaded on the casing arranged to pull the nozzle into tight abutting relation to the valve casing, said conduit, casing and nozzle being provided with a substantially straight passage for delivering cement from the receptacle to the outlet of the nozzle.

2. In a machine for applying cement to workpieces, a container having an outlet at the bottom, a hollow member in alinement with and secured to said outlet, a vertically divided two-part nozzle arranged, when assembled, to have an inverted conical outer upper end, and a sleeve having a portion surrounding and rotatably engaging the conical end of the nozzle and threaded on the hollow member to draw said nozzle parts together and to hold them rigidly in abutting relation with the hollow member.

3. In a machine for applying bands of cement to the margins of workpieces, a frame, a cement container having a bottom outlet, trunnions on said container, a bifurcated bell crank on the frame having notches to receive and support said trunnions for pivotally supporting said container upon the frame to swing about a horizontal axis extending from front to back of the machine, a valve casing removably connected to the outlet of the container and having a movable valve member, a nozzle removably and rigidly connected to the valve beneath said container, a screw for adjusting the bell crank to raise or lower the nozzle, a work support beneath the nozzle, means for feeding the work toward the rear of said machine, an operator-controlled device connected to said movable valve member by a universal joint, and readily disconnectible means for swinging the assembled container, valve and nozzle laterally of said axis to vary the position of the outlet end of the nozzle with respect to the support without interfering with the operation of the valve.

References Cited in the file of this patent

UNITED STATES PATENTS

| | | |
|---|---|---|
| 588,517 | Watkins | Aug. 17, 1897 |
| 896,986 | Glass | Aug. 25, 1908 |
| 1,882,459 | Tyner | Oct. 11, 1932 |
| 2,042,479 | Newhall | June 2, 1936 |
| 2,097,572 | Newhall | Nov. 2, 1937 |
| 2,255,854 | MacKenzie | Sept. 16, 1941 |